Figure 1:
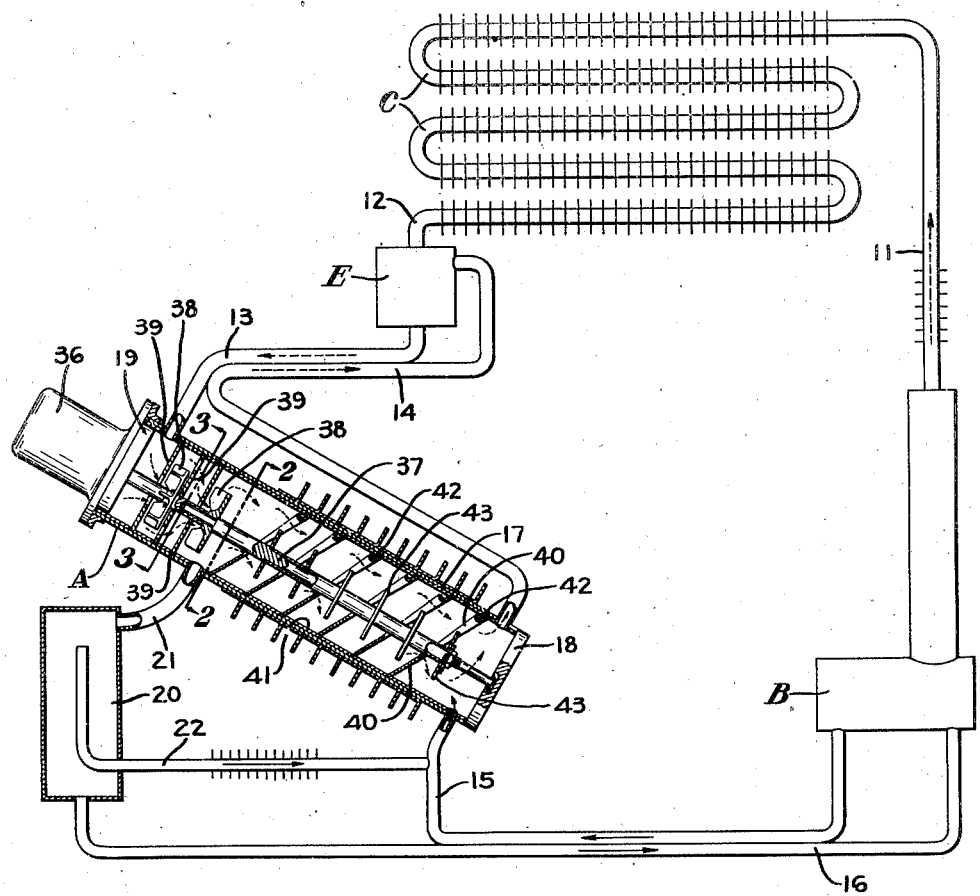

May 2, 1939. A. D. SIEDLE 2,156,925
ABSORBER FOR REFRIGERATING SYSTEMS
Filed Feb. 10, 1936 2 Sheets-Sheet 1

INVENTOR
Arnold D. Siedle
BY Harry S. Demaree
ATTORNEY

May 2, 1939. A. D. SIEDLE 2,156,925
ABSORBER FOR REFRIGERATING SYSTEMS
Filed Feb. 10, 1936   2 Sheets-Sheet 2
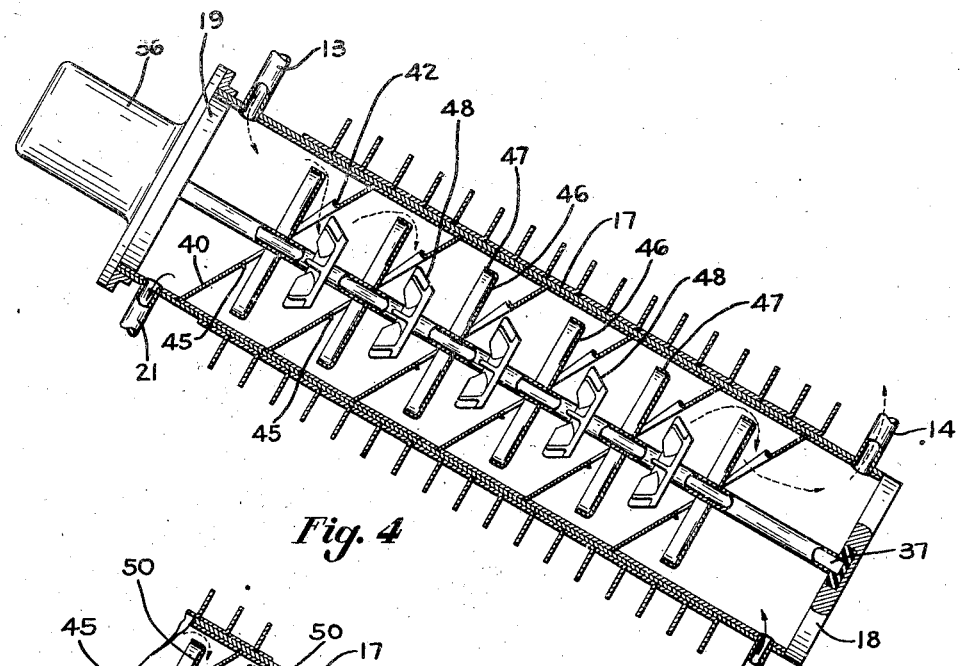
Fig. 4
Fig. 5
Fig. 6
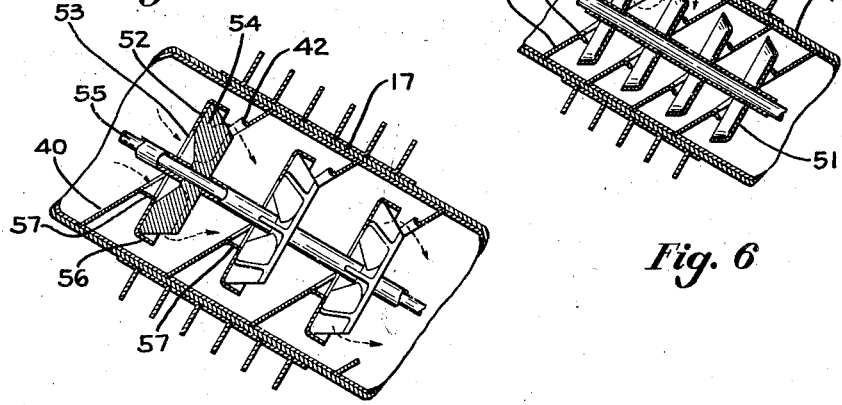
Fig. 7
INVENTOR
Arnold D. Siedle
BY Harry J. Demaree
ATTORNEY Patented May 2, 1939

2,156,925

UNITED STATES PATENT OFFICE 2,156,925

ABSORBER FOR REFRIGERATING SYSTEMS

Arnold D. Siedle, Canton, Ohio, assignor to The Hoover Company, North Canton, Ohio, a corporation of Ohio Application February 10, 1936, Serial No. 63,190

11 Claims. (Cl. 261—92)

This invention relates to absorbers for continuous absorption refrigerating systems of the type in which an inert gas is employed and more particularly to means for circulating fluids therein.

This application includes subject matter originally disclosed in application Serial No. 23,628 which was filed May 27, 1935, as a joint application of Curtis C. Coons and Arnold D. Siedle. Subsequent to the filing of the said application, the subject matter of the present application was removed therefrom and the original application was changed to a sole application of Curtis C. Coons. This application is also related to application Serial No. 45,528, filed October 18, 1935, in the name of Rudolph S. Nelson, and application 63,191 filed February 10, 1936, in the name of Arnold D. Siedle which disclose and claim a modified form of the present invention.

This invention relates particularly to an absorption refrigerating system of the type in which an inlet gas is circulated between the evaporator and the absorber while an absorption solution is circulated between the boiler and the absorber in which the gas and liquid are brought into intimate contact to absorb vapor formed in the evaporator and from which the heat of absorption is rejected to any suitable cooling medium, preferably atmospheric air. According to the present invention, the inert gas and the absorption solution are both circulated from a single power driven element which is hermetically sealed in the absorber wherein it may act simultaneously on the gas and the liquid.

It is a further object of the invention to provide fluid circulating means, which may be hermetically sealed in an absorber of an absorption refrigerating system, and which in addition to causing both a gas and a liquid to flow in the desired direction, brings the gas and liquid into very intimate contact and splashes or throws them about the inner wall of the absorber so as to enable the heat of absorption to be rapidly discharged. This object is attained in a particularly advantageous manner if a number of eddy currents are set up in both the gas and the liquid passing through the absorber.

It is another object of the invention to provide an absorber for a refrigerating system with power driven means which may be hermetically sealed therein and which causes liquid to flow upwardly through the absorber while contacting with the gas to be absorbed at a number of places.

Figure 2:
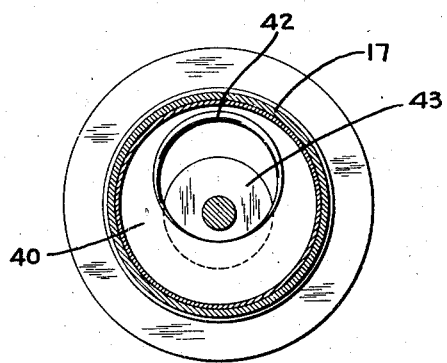
Figure 3:
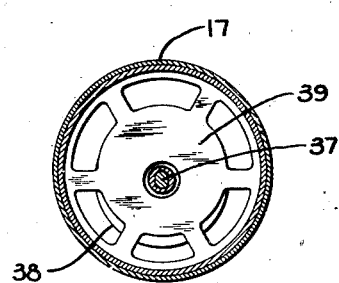

Other objects reside in certain novel features of the arrangement and construction of parts as will be apparent from the following description taken in connection with the accompanying drawings in which:

Figure 1 is a diagram illustrating a complete absorption refrigerating system with the absorber thereof shown in vertical cross section and somewhat in detail, the arrangement showing one embodiment of the invention, Figure 2 is a transverse cross-sectional view of the absorber illustrated in Figure 1, the view being taken on the line 2—2 thereof, Figure 3 is a transverse cross-sectional view of the absorber illustrated in Figure 1, the view being taken on the line 3—3 of Figure 1, Figure 4 is a vertical cross sectional view of an absorber illustrating another embodiment of the invention, Figure 5 is a fragmentary vertical cross-sectional view of another form of absorber, this view illustrating an arrangement of cups and baffle plates which may be substituted for the arrangement of similar elements illustrated in Figure 1, Figures 6 and 7 are fragmentary vertical cross-sectional views of still other forms of absorbers constructed in accordance with the invention.

Referring to the drawings in detail and first to the arrangement illustrated in Figure 1, it will be seen that a continuous absorption refrigerating system is illustrated as consisting of a boiler B, a condenser C, an evaporator E and an absorber A connected together in a more or less conventional manner. The boiler B is connected to the condenser C by means of a conduit 11, a portion of which may act as a rectifier so that when heat is applied to the boiler, refrigerant gas will flow through the pipe 11, condense in the condenser C and be fed into the evaporator E through the conduit 12. The evaporator E is connected to the absorber A by means of two gas conduits 13 and 14 which may be in heat exchange relation and which form a circuit for the flow of inert gas between the evaporator and the absorber as will be explained hereinafter.

The boiler B is connected to the absorber A by means of two liquid conduits 15 and 16 which may be in heat exchange relation.

The main vessel of the absorber A illustrated in Figure 1 consists of a cylinder 17 disposed in an inclined position and provided with end pieces or heads 18 and 19. A small auxiliary vessel 20, which may be regarded as a part of the absorber, is located a slight distance below the main vessel 17 and is connected thereto by a short pipe 21 at its upper end. An additional pipe 22 which extends into the upper portion of the vessel 20 connects it to pipe 15 just below the point where this pipe enters the lower portion of the vessel 17. The conduit 16, mentioned above, is connected to the lower portion of the small auxiliary vessel 20.

By means which will presently be described, absorption liquid is lifted or pumped in the main absorber vessel 17 from a pool formed in the lower end thereof near the point of connection of the conduit 15, upwardly through the vessel and conveyed into the pipe 21. When liquid is so pumped it flows in two cycles, one being from the vessel 17 through the pipe 21, the small auxiliary chamber 20, the conduit 16, the boiler B, the conduit 15 back to the vessel 17 while the other is from the vessel 17 into the vessel 20, through the conduit 21 in which the liquid level is such that a certain amount will overflow into the pipe 22 and be conveyed back through the pipe 15 without going through the boiler B. In order to regulate or maintain the proper flow through the boiler and through the by-pass pipe 22, valves or restrictions (not shown) may be placed in the pipes 16 or 22 if desired, but if the pumping means in the absorber is driven at the proper speed such restrictions will not be necessary since the regulation of flow will be automatic.

As has been indicated above, means is provided for circulating inert gas through the absorber vessel 17, the evaporator E and the conduits 13 and 14. The inert gas may be circulated in either direction. In the arrangement shown, it is caused to flow downwardly in counterflow to the passage of liquid upwardly through the absorber.

It is within the purview of the invention to dispense with the auxiliary vessel 20 and the conduit 22 and connect the pipe 16 directly to the pipe 21, but inasmuch as certain advantages are gained by recirculating the absorption liquid before it returns to the boiler, the use of such a vessel is preferred.

In the arrangement of Figures 1, 2, and 3 an absorber is illustrated in which rotating means is provided therein for circulating the inert gas, for causing the absorption liquid to move upwardly through the absorber, and for splashing the absorption liquid over the inside of the absorber vessel.

For this purpose, a rotor of a motor 36 is connected to a shaft 37 which passes longitudinally through the vessel 17, but slightly below the center line thereof as illustrated in Figures 2 and 3. The upper portion of the shaft 37 carries one or more centrifugal fans 38. Baffle plates 39 are secured in vessel 17, these plates having central or outer openings therein to cooperate with the fans 38 to cause the gas to move in the desired direction. The fans 38 are preferably located above the liquid level in the absorber vessel which level is determined by the location of the outlet pipe 21.

The lower portion of the shaft 37 carries a number of discs 43 of rather small diameter, these being secured to the shaft in any suitable manner, as by the spacing sleeves and nut shown.

Elliptically shaped baffle plates, the minor axis of which is slightly less than the diameter of the cylinder 17, are disposed in an inclined position in the vessel, being retained by spacing rings 41 which are formed by diagonally slicing a tube of slightly smaller diameter than that of the cylinder 17. Each baffle plate 40 has an offset opening therein, the upper portion of which is flanged as is illustrated at 42. The openings in the plates 40 are of sufficient size to enable the discs 43 on the shaft 37 to pass therethrough so that the absorber may be assembled or disassembled without removing the baffle plates 40. As shown in Figure 1 the openings in the plates 40 may be circular, although it is not necessary that the vertical diameter be as great as the diameter of the discs 43 because these discs may be raised and lowered as they are successively passed through the openings.

The lower portion of the absorber vessel of Figure 1 may be disposed at the same level as the boiler, so that a pool of liquid exists above the point of entrance of the conduit 15. As the shaft 37 is rotated, liquid is picked up by the lower disc 43 and splashed about the interior of the absorber, some of this liquid being thrown through the opening in the lower plate 40 and either running down the wall of the absorber vessel or being collected above the flange 42 so as to be conveyed to a higher level. Thus pools of liquid form above each baffle plate 40 and liquid is successively thrown upward therefrom by the discs 43 until finally carried away through the outlet conduit 21. It is to be noted that with this arrangement only a small portion of the liquid is thrown through the openings in the plate 40, the remainder being splashed about the interior of the absorber vessel so as to bring the liquid and gases therein in intimate contact. At the same time the fan or fans 38 may cause the inert gas to flow downwardly through the vessel as indicated by the arrows in dotted lines, so that the liquid and gases flow through the absorber vessel in opposite directions. The inert gas first comes in contact with the liquid at the upper end of the absorber and leaves at the lower end where the vessel is the cooler.

Figures 4 to 7 illustrate various embodiments of the invention in which different forms of splashers or pumps are used for causing liquid to pass upwardly through an inclined absorber vessel similar to the arrangement shown in Figures 1, 2, and 3, and in which different arrangements for causing the inert gas to flow through this vessel are also illustrated. In these figures the parts corresponding to those of Figures 2 and 3 are similarly designated.

The arrangement of Figure 4 differs from that of Figure 1 in that the baffle plates 40 have a small depending lip 45 just beneath the openings therein. The liquid is lifted upwardly from one pool to another formed above each of the plates 40 in the arrangement of Figure 4, by means of discs 46, similar to those shown at 43 in Figure 1, except that they are provided with flanges 47 around their peripheries and are of larger diameters so as to extend through openings in the plates 40. Any overflow from a pool above a baffle plate 40 falls upon the disc 46 immediately beneath that baffle plate, the liquid dripping from the lip 45 onto the interior of the flange 47 so as to be thrown outwardly therefrom and splashed around the interior of the absorber vessel.

The means for circulating the inert gas through the absorber vessel in the arrangement of Figure 4 consists in a number of fans which may be of any suitable shape which would cause the gas to flow in the downward direction indicated. The fan arrangement illustrated consisting of centrifugal fans 48 alternately disposed between the discs 46 and having an outer inclination of such a nature as to cause the inert gas to be thrown rather violently against the pools formed in the lower portion of the absorber vessel, which is maintained moist by the absorption liquid thrown outwardly by the discs 46. Thus, in this arrangement, very intimate contact between gases and liquid is obtained.

If the means for circulating the inert gas is disposed upon the upper end of the shaft in the absorber, as in the arrangement of Figure 1, it is possible, if the discs, which throw the liquid about the absorber vessel and which lift it from one baffle plate to another, have a very close fit in the openings in the baffle plates, to cause the inert gas to have a very tortuous path and come in intimate contact with the absorption liquid as it passes through the openings in the baffle plates. Arrangements of this kind are illustrated in Figures 5 and 6.

In the arrangement of Figure 5 the rotating discs 50 have flanges thereon and extend through the openings in the baffle plates 40, but are fitted so closely in these openings as to permit but small space for the passage of gases between the edge of each plate and the rotating disc.

In the arrangement of Figure 6 the discs 51 are similarly disposed but have a flange thereon flared outwardly somewhat so as to better contact with the surface of the liquid in the pools on the baffle plates, and so as to cause a slightly different splashing action.

The objects of Figures 5 and 6 are also attained to some degree in the arrangement of Figure 7, in which centrifugal fans are combined with rotating discs in such a way that the discs aid the fans in causing movement of inert gas.

In Figure 7, each rotating disc 52 is provided with a central opening 53 and is mounted upon a centrifugal fan structure 54, which is in turn secured to the shaft 55. The outer portion of each disc 52 is provided with a downwardly extending flange 56, which in a sense cooperates with the main body of the disc 52 to provide a shroud for the fan 54. Upon rotation of the shaft 55 the discs 52 throw liquid upwardly from one pool to another, as previously described, and the overflow from these pools is conveyed by lips 57 upon the rotating blades of the fan. This overflow is thrown outwardly with the inert gas and is splashed around the interior of the absorber. At the same time a large percentage of the liquid in an individual pool is also splashed around.

From the above description it may be obvious that the invention may be carried out in a number of ways. Various other changes not illustrated will be apparent to those skilled in the art without departing from the spirit of the invention or the scope of the annexed claims.

I claim:

1. An absorber adapted for use in a continuous absorption refrigerating system, said absorber including a closed inclined vessel, baffle plates in said vessel disposed in spaced relation and adapted to maintain a number of pools of liquid therein, said baffle plates having openings therein and power driven means disposed within said vessel and including a number of rotary members adjacent said baffle plates and disposed at acute angles thereto, the assembly being such that each rotary member dips into a pool formed by the subjacent baffle plate and extends through the opening in the superjacent baffle plate, whereby a portion of the spray created from each pool is thrown through the opening in a higher baffle.

2. An absorber adapted for use in the continuous absorption refrigerating system, said absorber, including a closed vessel, baffle plates in said vessel disposed in spaced relation and adapted to maintain a number of pools of liquid therein, said baffle plates having openings therein and power driven means disposed within said vessel and including a number of rotary members adjacent said baffle plates and disposed at acute angles thereto, so as to dip into said pools and throw liquid through the openings in said baffle plates when rotated, and catch lips on each baffle plate arranged to direct a portion of the spray thrown through the opening in its associated baffle plate into the pool formed thereby.

3. A combined liquid elevating and gas and liquid contact device comprising a rotating member, means supplying a liquid to be elevated to said member, and means having a liquid retaining portion positioned above said rotating member, and also having an opening intercepting the plane of rotation of said member whereby liquid thrown by centrifugal action from said member will pass through said opening and be retained by the retaining portion of said means, and means for passing a gaseous medium through said liquid as it is being elevated in said device.

4. A device for conveying liquid from a lower to higher level comprising a plurality of rotating members, a plurality of liquid retaining vessels, each of said vessels including a member having an opening therein, said members being positioned on successively higher elevations, said rotating members, said vessels and said openings being so arranged that the lower portion of the rotating members dip into liquid in the vessels, and the planes of rotation of the rotating members intercept said openings whereby liquid is thrown from one of said vessels through an opening to a higher vessel.

5. An absorber comprising an inclined vessel, means for propelling a gaseous mixture containing a gas to be absorbed through said vessel, means for supplying an absorption solution to said vessel, a plurality of baffle plates in said vessel adapted to form liquid pools therein and inclined to the axis thereof, said baffle plates being formed with openings, a plurality of spraying devices in said vessel positioned substantially normal to the axis thereof and arranged so that the plane of rotation of each baffle plate intersects the opening in the adjacent higher baffle, and means for rotating said spraying devices.

6. Absorption refrigerating apparatus comprising a vessel, means for circulating a pressure equalizing medium refrigerant vapor mixture through said vessel, means forming an absorption solution circuit including said vessel, means forming a plurality of liquid pools in said vessel, power driven means for creating a plurality of sprays of absorption solution substantially normal to the axis of said vessel, and means for trapping a portion of the spray generated in each pool into an adjacent pool, and means for returning a portion of the liquid circulated through said vessel to the liquid inlet thereof.

7. Absorption refrigerating apparatus comprising a vessel, means for circulating a pressure equalizing medium refrigerant vapor mixture through said vessel, means forming an absorption solution circuit including said vessel, means forming a plurality of liquid pools in said vessel, power driven means for creating a plurality of sprays of absorption solution substantially normal to the axis of said vessel, and means for trapping a portion of the spray generated in each pool into an adjacent pool, means for returning directly to the solution inlet portion of the absorber a portion of the solution discharged therefrom, and means for cooling such portion of the solution.

8. Absorption refrigerating apparatus comprising an inclined absorber vessel, power driven means within said vessel for circulating absorption solution upwardly therethrough and for creating solution sprays, means for forcing refrigerant to be absorbed through said sprays, means for supplying absorption solution to said vessel, means for removing absorption solution from said vessel, means for diverting a portion of the solution elevated through said vessel directly to the lower end thereof, and means for cooling solution so diverted.

9. An absorber comprising an inclined vessel, means forming a gas circuit including said vessel, means forming a solution circuit including said vessel, a plurality of pool forming baffle plates in said vessel having openings, a plurality of spraying devices in said vessel, means for actuating said spraying devices, each of said spraying devices being positioned to project spray through the opening in an adjacent higher baffle; and said power driven means including a plurality of gas circulating fans.

10. An absorber comprising an inclined vessel, means forming a gas circuit including said vessel means forming a solution circuit including said vessel, a plurality of pool forming baffle plates in said vessel having openings, a plurality of spraying devices in said vessel, means for actuating said spraying devices, each of said spraying devices being positioned to project spray through the opening in an adjacent higher baffle, and said power driven means including a plurality of gas circulating fans, said fans and rotary members being arranged alternately along the length of said vessel.

11. An absorber comprising an inclined vessel, means forming a gas circuit including said vessel, means forming a solution circuit including said vessel, a plurality of pool forming baffle plates in said vessel having openings, a plurality of spraying devices in said vessel, means for actuating said spraying devices, each of said spraying devices being positioned to project spray through the opening in an adjacent higher baffle, and said power driven means including a plurality of gas circulating fans, said fans and rotary members being integral.

ARNOLD D. SIEDLE.